（12） United States Patent
Huppi et al.

(10) Patent No.: US 6,776,497 B1
(45) Date of Patent: Aug. 17, 2004

(54) APPARATUSES AND METHODS FOR ILLUMINATING A KEYBOARD

(75) Inventors: Brian Huppi, San Carlos, CA (US); Thai Q. La, San Jose, CA (US); Walter Joseph Galbraith, Jr., Sunnyvale, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 10/300,545

(22) Filed: Nov. 19, 2002

(51) Int. Cl.[7] .............................................. F21V 33/00
(52) U.S. Cl. ...................... 362/85; 362/109; 362/559; 362/560; 362/31
(58) Field of Search ............................ 362/26, 85, 109, 362/561, 31, 253, 99, 551, 559

(56) References Cited

U.S. PATENT DOCUMENTS

| | | | |
|---|---|---|---|
| 4,449,024 A | | 5/1984 | Stracener |
| 4,626,965 A | * | 12/1986 | Gupta et al. .................... 362/33 |
| 4,760,277 A | * | 7/1988 | Vurpillat ....................... 307/64 |
| 5,097,396 A | | 3/1992 | Myers |
| 5,397,867 A | | 3/1995 | Demeo |
| 5,461,400 A | | 10/1995 | Ishii et al. |
| 5,793,358 A | | 8/1998 | Petkovic et al. |
| 5,815,225 A | * | 9/1998 | Nelson ......................... 349/65 |
| 5,844,773 A | * | 12/1998 | Malhi ........................... 361/681 |
| 5,961,198 A | | 10/1999 | Hira et al. |
| 6,040,811 A | * | 3/2000 | Malhi ........................... 345/87 |
| 6,046,730 A | | 4/2000 | Bowen et al. |
| 6,179,432 B1 | | 1/2001 | Zhang et al. |
| 6,448,955 B1 | | 9/2002 | Evanicky et al. |
| 6,474,823 B1 | * | 11/2002 | Agata et al. .................. 362/26 |

* cited by examiner

Primary Examiner—Thomas M. Sember
(74) Attorney, Agent, or Firm—Blakely, Sokoloff, Taylor & Zafman LLP

(57) ABSTRACT

An illumination system for a computer system. In one exemplary embodiment, a light guide panel has a first end and a second end, wherein lights from a light source enter the light guide panel from the first end and exit through the second end. A light guide tube is coupled to the second end of the light guide panel. The light guide tube captures the lights that exit the second end and reflecting the lights downward illuminating at least a portion of a keyboard of the computer system. The chassis that houses the display assembly includes a plurality of holes created along the top edge of the chassis wherein the lights captured and reflected by the light guide tube exit through the plurality of holes.

12 Claims, 7 Drawing Sheets

APPARATUSES AND METHODS FOR ILLUMINATING A KEYBOARD

BACKGROUND

The present invention relates to methods and apparatuses for making a keyboard having a lighting system. The keyboard having the lighting system can be used in conjunction with a computer system.

A keyboard is commonly used in conjunction with a computer as an input device. Keyboards usually have a plurality of keycaps wherein alphanumeric symbols (or symbols in foreign languages) are printed on the keycaps to help users select the desired input to the computer. Under normal condition, such as under a brightly lit environment, the users typically have no difficulty using the keyboard since the symbols on the keycaps can be seen easily. However, in a dark environment or in a low ambient light condition, users are unable to see the symbols on the keycaps clearly or unable to see the symbols at all.

Various methods exist in the prior art for illuminating keyboards. For example, U.S. Pat. No. 6,179,432 by Zhang et al, contemplates a keyboard having an illumination panel inserted within the keyboard. The illumination panel in the keyboard in Zhang's patent is placed between the keycaps and metal plate of the keyboard. Such an addition of the illumination panel requires reconfiguration of the keyboard. Further, integrating the illumination panel into the keyboard by placing the illumination panel between the keycaps and the metal plate of the keyboard decreases the key travel of the keyboard, which can be referred to as the downward travel distance for each key in the keyboard. In order to maintain the same key travel, the keyswitch mechanism in the key-board has to be re-designed and as such, will result in an increase in the overall thickness of the key-board. Reconfiguration of the keyboard thus imposes more unnecessary cost to the making of the keyboard. Also, illuminating the keyboards using such conventional methods requires extra power which is not desirable.

SUMMARY

Exemplary embodiments of the present invention discloses an apparatus and a method of lighting a keyboard of a computer system that has a backlighting display system such as a notebook computer system.

In a conventional computer system with a backlighting display system, some light emitted from the light source is typically wasted as the light escapes at the end of a light guide panel. The present invention, in one embodiment, utilizes the unused light or the escaped light that is not used in illuminating the display assembly. Pluralities of light guide tubes are coupled to the light guide panel at the end portion where the light escapes. The light guide tubes capture the escaped or unused light that would escape at the end portion of the light guide panel. The light guide tubes redirect the captured light out of the display chassis. In one embodiment, the light guide tubes redirect the captured light so as to direct the light downward to illuminate the keyboard of the computer system.

In one exemplary embodiment, a light guide panel is disposed within a display assembly of a computer system. The light guide panel has a first end and a second end, wherein lights from a light source enter the light guide panel from the first end and exit through the second end. A light guide tube is coupled to the second end of the light guide panel. The light guide tube captures the lights that exit the second end and reflect the lights downward illuminating at least a portion of a keyboard of the computer system. The chassis that houses the display assembly includes a plurality of holes created along the top edge of the chassis wherein the lights captured and reflected by the light guide tube exit through the plurality of holes to illuminate at least a portion of the keyboard.

In another embodiment, an illumination system for a keyboard includes a light guide disposed within a display assembly of, for example, a laptop computer, and a reflector optically coupled to the light guide. The light guide may be the light guide that serves to spread light evenly across a display area of the display from a source of light such as a tubular light "bulb." The reflector may be optically coupled to an end of the light guide to receive light from the light guide and to reflect the light out and onto the keyboard. The reflector may be a portion of the light guide itself positioned outside of the display area of the display area. The reflector may be positioned near an optically transparent, transmissive, or translucent aperture to allow light to be reflected out and onto the keyboard. The aperture need not be a hole but may be a transparent portion of a surface of a covering on the display assembly. The reflector is normally disposed outside of the display area (e.g., above the upper most portion of the viewable display area). The reflector reflects light outside of the display area and down onto the keyboard.

BRIEF DESCRIPTION OF THE DRAWINGS

Exemplary embodiments of the present invention are illustrated by way of example and not limitation in the figures of the accompanying drawings.

DETAILED DESCRIPTION

Figure 1:
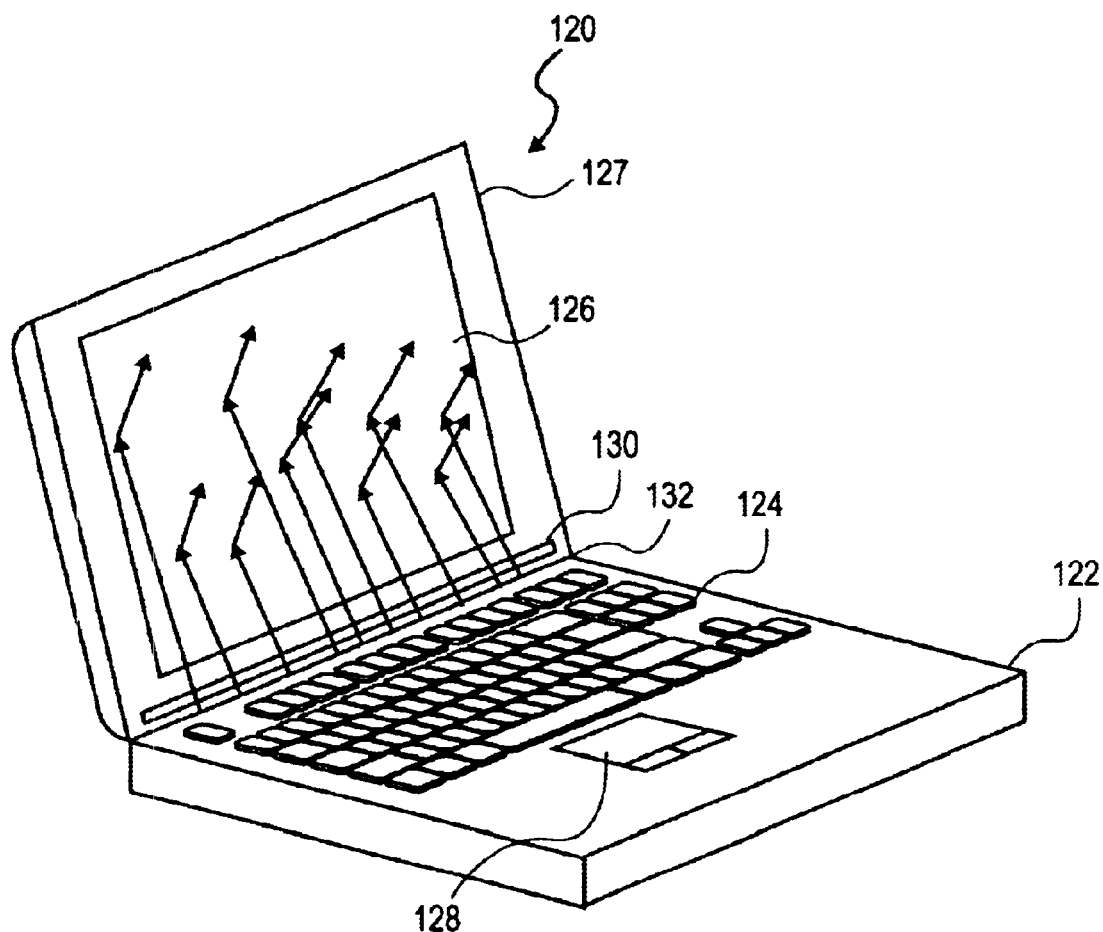
FIG. 1 illustrates an exemplary computer system that includes a backlighting display assembly.

The subject invention will be described with reference to numerous details set forth below, and the accompanying drawings will illustrate the invention. The following description and drawings are illustrative of the invention and are not to be construed as limiting the invention. Numerous specific details are described to provide a thorough understanding of embodiments of the present invention. However, in certain instances, well-known or conventional details are not described in detail in order to not unnecessarily obscure exemplary embodiments the present invention. In the drawings, the same element is labeled with the same reference numeral.

FIG. 1 illustrates an example of a computer system that may incorporate a keyboard lighting system of exemplary embodiments of the present invention. The examples shown in these figures are for illustration purposes and not meant to be a limitation of the application of the present invention. FIG. 1 illustrates a computer system 120, which is a notebook type personal computer system. As illustrated, a keyboard 124 is incorporated into the computer system 120 into an outer housing 122 of the computer system 120. The computer system 120 also includes a display assembly 126, and optionally, a mouse (not shown). The computer system 120 also includes a hinge (not shown), which couples the display assembly 126 to the keyboard 124. An angle between the display assembly 126 and the keyboard 124 may be selectively adjusted. A touch pad 128 is incorporated into the computer system 120 into the outer housing 122. In a notebook computer system such as the computer system 120, the touch pad 128 functions as a mouse. The display assembly 126, the keyboard 124 and the touch pad 128 provide a system for permitting a user to interact with the computer system 120. The keyboard 124, the display assembly 126, and the touch pad 128 (or the mouse) are connected to a central computer module (not shown). The central computer module is housed in the outer housing 122 and typically includes, for instance, a hard drive and microprocessor that control the operation of the computer system 120. In one embodiment, the microprocessor causes or controls the appearances of images within the display area of the display assembly 126. The computer system 120 may also includes a plurality of speakers and other drivers (not shown).

The display assembly 126 is housed in a display casing or chassis 127 made of metal, plastic, or other hard material. The display assembly 126 includes a liquid crystal display (LCD) screen typically having 1280 pixels by 1024 pixels by red-blue-green (RGB) color and utilizes amorphous silicon thin film transistors (TFT). In one embodiment, the display assembly 126 is composed of color TFT-LCD panel, driver integrated circuits (ICs), control circuitry, and power supply circuitry all contained in a rigid bezel. Various flat panel LCD screens and screen technologies can be used within the scope of the present invention with proper configuration.

The display assembly 126 is illuminated by a light source 130 disposed at the bottom edge 132 of the display assembly 126. In one embodiment, a cold cathode fluorescent (CCF) tube is the light source 130 disposed at the bottom edge 132 of the display assembly 126. In another embodiment, a hot cathode tube is used. Light from the light source 130 illuminates the whole display screen from the backside of the display assembly 126. The display assembly 126 may include one or several light sources depending on the types of displays and the types of light sources.

Figure 2:
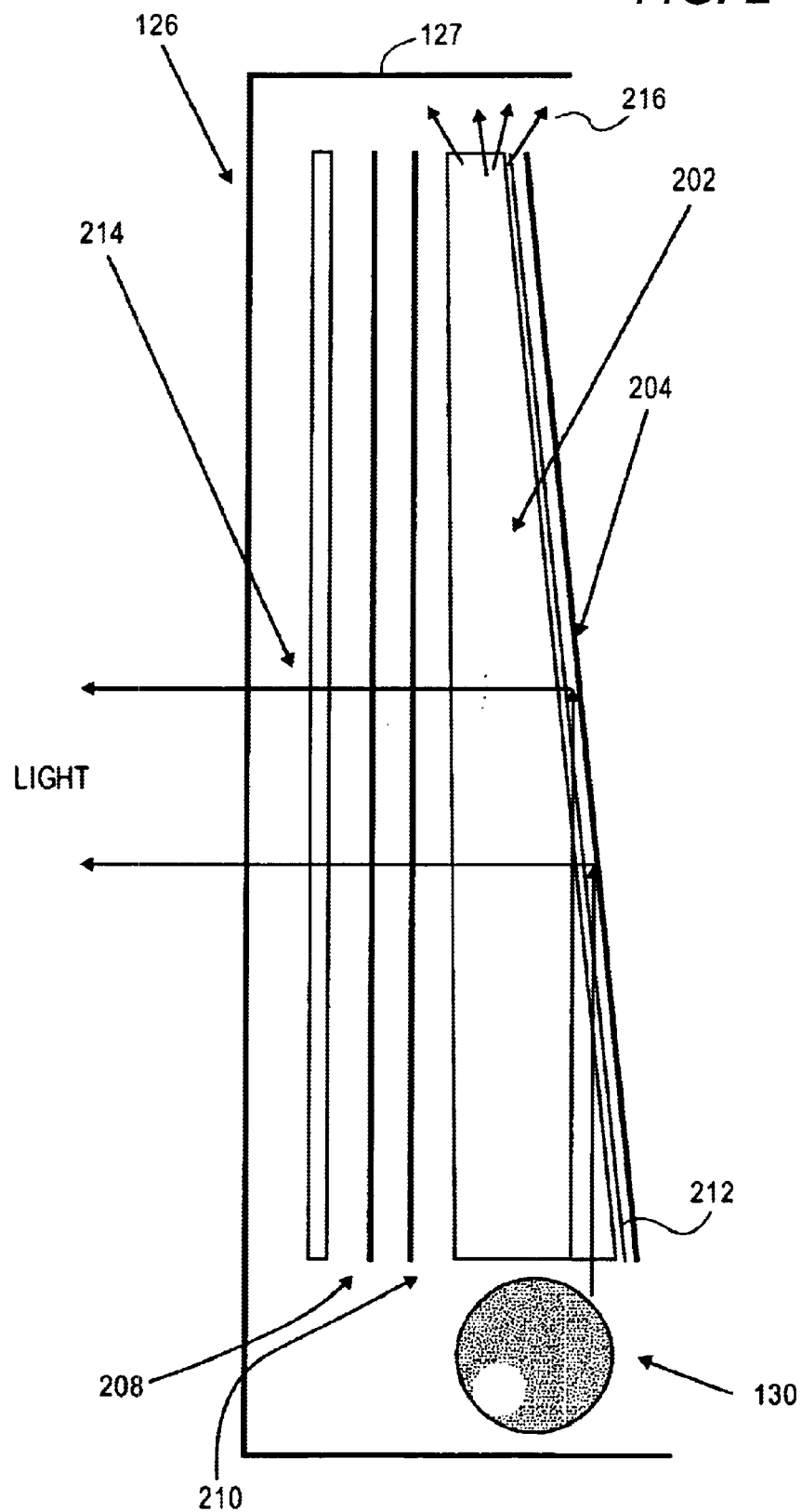
FIG. 2 illustrates a cross section view of an exemplary backlighting display assembly.

The display assembly 126 further includes a light guide panel 202 and a backlight reflector sheet 204 as illustrated in FIG. 2. Note that FIG. 2 illustrates only a cross-sectional area of the display assembly 126. The light source 130 is disposed at and along one lateral side of the light guide panel 202 (also known as optical waveguide panel). The light guide panel 202 is made of a light-transmissive material. In one embodiment, a diffusing sheet 210 formed of a synthetic resin of milk-white color having a light scattering effect is mounted over a top surface of the light guide panel 202. The diffusing sheet 210 functions to uniformly illuminate the light from the light source 130, which is reflected off the reflector sheet 204, over the whole display screen of the display assembly 126. In one embodiment, at least one prism sheet 208 is disposed on the diffusing sheet 210 for the purpose of enhancing axial luminance (luminance in the direction orthogonal to the display screen) of the display assembly 126 by converging diffused light rays.

In addition, the display assembly 126 may include a light scattering layer 212 disposed over a rear surface of the light guide panel 202 at a side opposite to the light exit side in order to scatter the light rays traveling through the light guide panel 202 in the direction toward the diffusing sheet 210. The light scattering layer 212 may be manufactured with the aim to further aid in uniformly illuminate the light from the light source 130 that is reflected off from the reflector sheet 204 and which exits the light scattering layer 212.

In one embodiment, the display assembly 126 includes a liquid crystal panel 214 formed on top of the prism sheet 208. The liquid crystal panel 214 typically includes, in the following order, a polarizing plate, a row of thin film transistors, a liquid crystal cell array, a common electrode, a color filter, and another polarizing plate, sequentially formed on top of the prism sheet 208 using conventional methods. It should be noted that the liquid crystal panel 214 described is for illustrative purpose and that the embodiments of the present invention are not restricted to the structure of the liquid crystal display panel 214. For example, the display assembly 126 may be other type of flat panel display devices well known in the art.

In one embodiment, the display assembly 126 is a backlighting display system. To illuminate the display assembly 126, light is emitted from the light source 130 and introduced into the optical waveguide or light guide panel 202. Light then undergoes scattering at the light scattering layer 212 so that the scattered light rays can be reflected back again into the light guide panel 202 under the action of the reflecting sheet 204 in order to illuminate the display panel 216 after transmission through the diffusing sheet 210 and the prism sheets 208. It can readily be understood that the structure of the backlighting optical waveguide or light guide panel for the display assembly 126 can be much more complicated than described.

Figure 3:
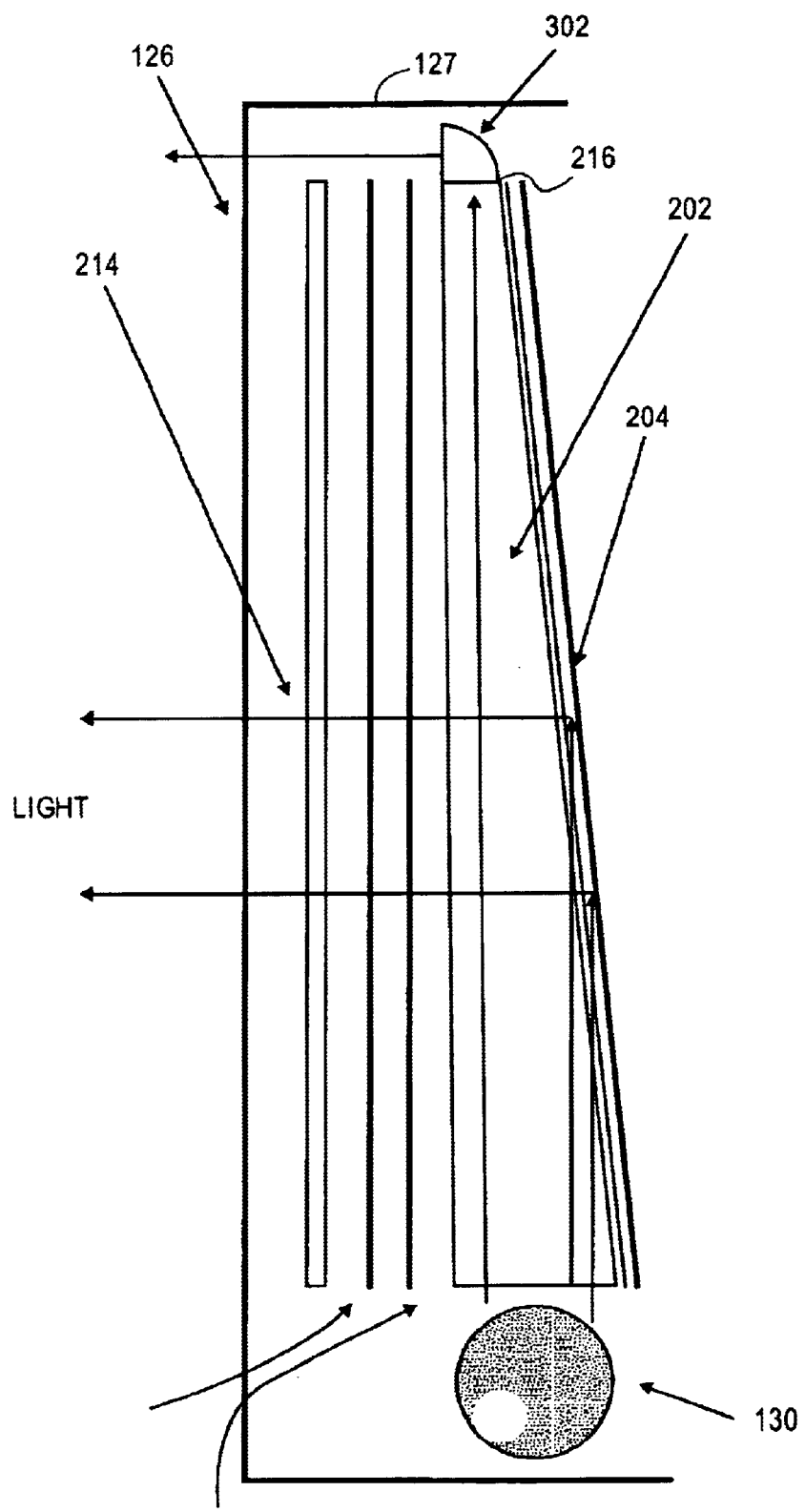
FIG. 3 illustrates a cross section view of an exemplary backlighting display assembly that includes a light guide tube to capture escaped or unused light at the end of the light guide panel used to illuminate the display screen of the display assembly.

In a conventional computer system with a backlighting display system, some light emitted from the light source is typically wasted as the light escapes at the end portion 216 of the light guide panel 202. Exemplary embodiments of the present invention utilize the unused light or the escaped light that is not used in illuminating the display assembly 126. As illustrated in FIG. 3, the display assembly 126 includes a plurality of light guide tubes 302, which are coupled to the light guide panel 202 at the end portion 216. It is to be appreciated that FIG. 3 only illustrates a cross section of the display assembly 126, thus only one of the light guide tube 302 is visible. In actuality, the plurality of the light guide tube 302 may be placed across the entire end portion 216 in as many locations as necessary. The light guide tubes 302 capture the escaped or unused light that would escape at the end portion 216 of the light guide panels 202. The light guide tubes 302 redirect the captured light out of the display chassis 127. In one embodiment, the light guide panel 303 redirects the captured light so as to direct the light downward to illuminate the keyboard 124 of the computer system 120.

Figure 4:
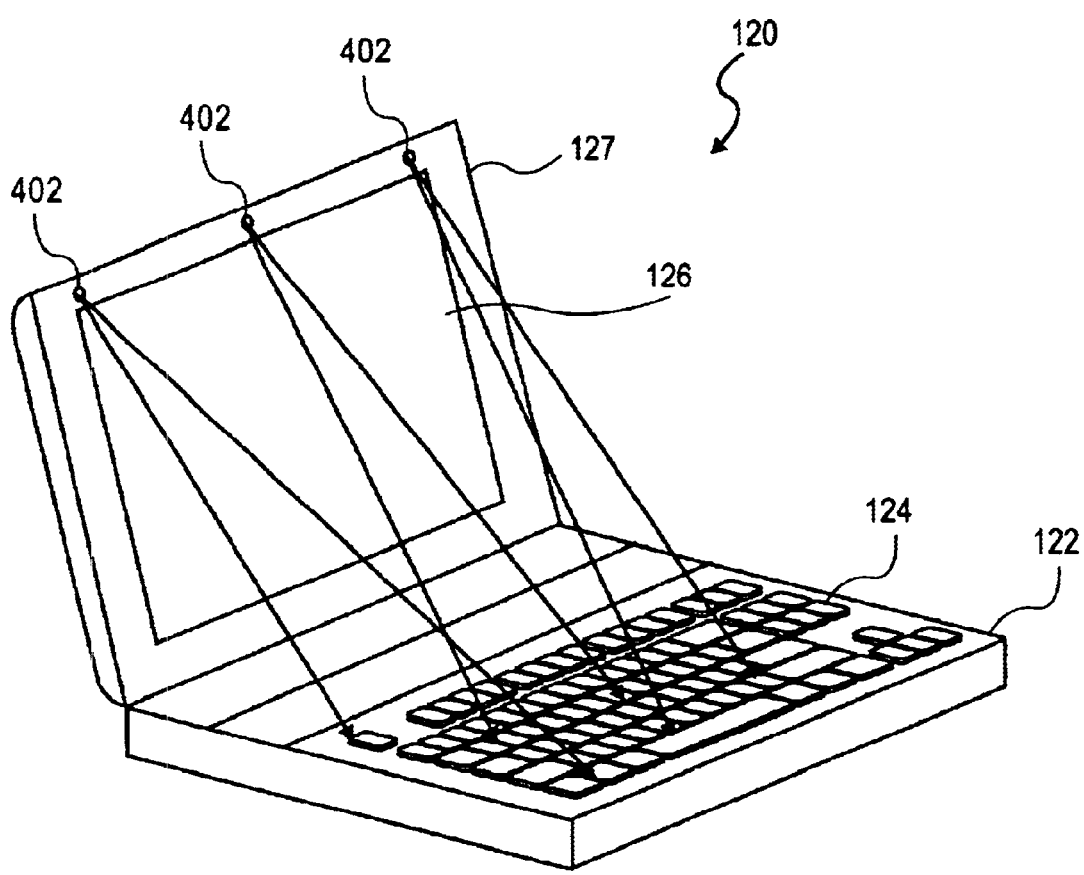
FIG. 4 illustrates an exemplary embodiment where the captured light in the light guide tube is redirected to illuminate the keyboard of the computer system.

In one embodiment, as illustrated in FIG. 4, the display chassis 127 includes a plurality of holes 402 where through the light recaptured and redirected by the plurality of the light guide tubes 302 exits to illuminate the keyboard 124. The light guide tubes 302 are configured so that the escaped light from the light guide panel 202 is captured within these light guide tubes and is redirected in a downward direction to illuminate the keyboard 124 through the holes 402. The holes 402 may be of any shape suitable to allow light to emit from the holes 402. For example, the holes 402 may have square shapes, rectangular shapes, or circular shape, and ideally, a rectangular shape to match the shape of a typical keyboard. Additionally, the holes 402 are sufficiently dimensioned to allow an adequate spectrum of light to emit from each of the holes 402 configured into the display chassis 127. In one embodiment, the holes 402 are of rectangular shapes and having a length of about 4 mm and a width of about 1 mm. It is to be appreciated that the dimensions and the shapes of the holes 402 may be varied depending on applications.

In one embodiment, the display chassis 127 includes portions that are made out of substantially optically translucent, transmissive, or transparent materials. These portions replace the plurality of holes 402 as shown in FIG. 4. The light guide tubes 302 are configured so that the escaped light from the light guide panel 202 is captured within the light guide tubes and is redirected in a downward direction to illuminate the keyboard 124 through these translucent, transmissive, or transparent portions. Similar to the holes 402, these portions may have any shape and size suitable to allow the escaped light to illuminate the keyboard.

Figure 5:
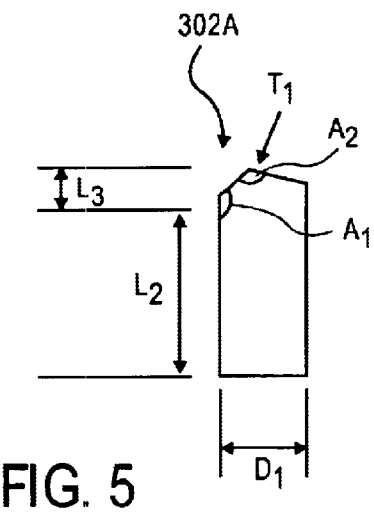
FIGS. 5 and 6 illustrate an exemplary configuration of the light guide tube shown in FIG. 3.
Figure 7:
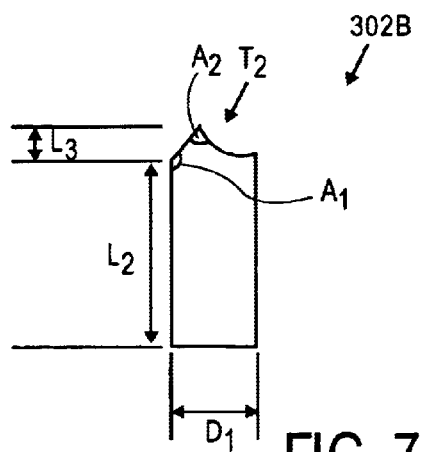
FIGS. 7 and 8 illustrate another exemplary configuration of the light guide tube shown in FIG. 3.

In one embodiment, the light guide tube 302 is configured as shown in FIG. 5. The light guide tube 302A shown in this figure has a prism construction. In one embodiment, the light guide tube 302A is a lens with at least two reflective sides. The light guide tube 302A has a diameter D1, a length L2, and a tip T1. The tip T1 extends a distance L3 from the length L2. The tip T1 also has an angle A1 and A2 which are configured for maximum light reflection downward onto the keyboard 124 as shown in FIGS. 4 and 7. In one embodiment, the diameter D1 is about 2 mm; the length L2 is about 4 mm; and the distance L3 is about 1 mm. These dimensions may be varied depending on how much clearance is available in the display chassis 127 or the dimension of the light guide panel 202.

Figure 6:
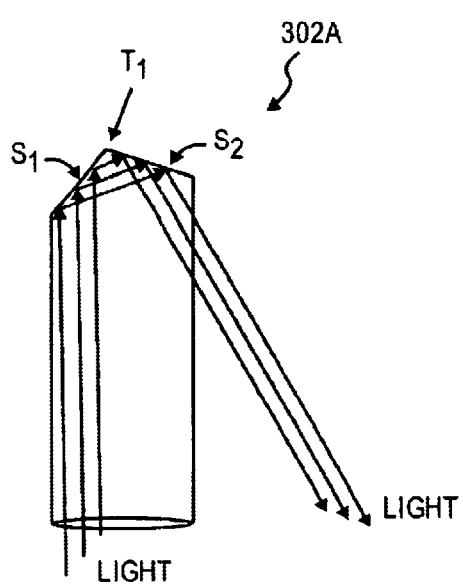

FIG. 6 illustrates the travel path of the captured light within the light guide tube 302A as the captured light is reflected off the tip T1 to illuminate in a downward manner. In one embodiment, light escaped from the end portion 216 of the light guide panel 202 enters the light guide tube 302A. The light then hits the first side S1 of the tip T1 and bounces off to the second side S2 of the tip T1 and bounces off from the side S2 to illuminate in a downward direction. Pluralities of the light guide tube 302A are coupled to the end portion 216 of the light guide panel 202. Pluralities of holes 402 would be configured into the display chassis 127. The holes 402 are aligned with the light guide tubes 302A. The captured light then is able to illuminate sections of the keyboard 124 or the entire keyboard 124.

Figure 8:
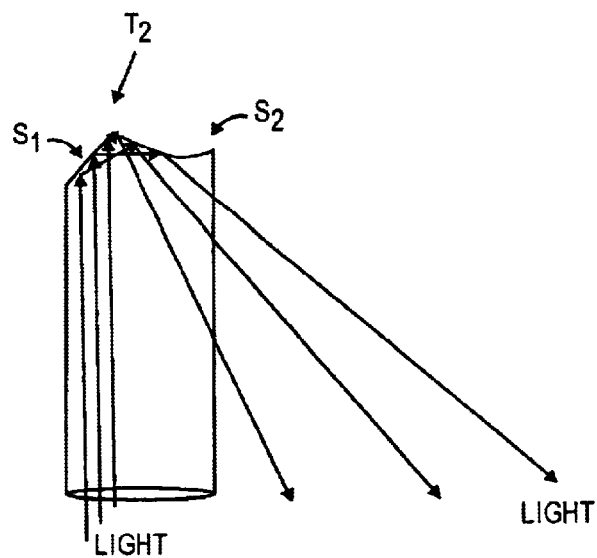

In another embodiment, the light guide tube 302 is configured as shown in FIG. 7. The light guide tube 302B shown in this figure has a concave construction. In one embodiment, the light guide tube 302B is a lens with a concave reflector. The light guide tube 302B has a diameter D1, a length L2, and a tip T2. The tip T2 extends a distance L3 from the length L2. The tip T2 also has an angle A1 and A2 which are configured for maximum light reflection downward onto the keyboard 124 as shown in FIGS. 4 and 8. The tip T2 is also concaved to allow the light to bounce off from the tip T2 in a broader spectrum. In one embodiment, the diameter D1 is about 2 mm; the length L2 is about 4 mm; and the distance L3 is about 1 mm. These dimensions may be varied depending on how much clearance is available in the display chassis 127 or the dimension of the light guide panel 202.

FIG. 8 illustrates the travel path of the captured light within the light guide tube 302B as the captured light is reflected off the tip T1 to illuminate in a downward manner. In one embodiment, light escaped from the end portion 216 of the light guide panel 202 enters the light guide tube 302B. The light then hits the first side S1 of the tip T2 and bounces off to the second side S2 of the tip T2 and bounces off from the second side S2 to illuminate in a downward direction. The concave configuration of the second side S2 of the light guide tube 302B causes the light to bounce off and cover a broader area than the configuration of the light guide tube shown in FIGS. 4 and 8. Pluralities of the light guide tube 302B are coupled to the end portion 216 of the light guide panel 202. Pluralities of holes 402 would be configured into the display chassis 127. The holes 402 are aligned with the light guide tubes 302B. The captured light then is able to illuminate sections of the keyboard 124 or the entire keyboard 124.

In one embodiment, the light guide tubes 302B are reflectors that are optically coupled to the end portion 126 of the light guide panel 202. The reflectors receive light from the light guide panel 202 and reflect the light out and onto the keyboard 124. The reflector may be a portion of the light guide itself positioned outside of the display area of the display area. The reflector may be positioned near an optically transparent, transmissive, or translucent aperture to allow light to be reflected out and onto the keyboard. The aperture may be holes (see below) that allow light to be reflected out of the reflector. The aperture need not be a hole but may be a transparent portion of a surface of a covering on the display assembly. The reflector is normally disposed outside of the display area (e.g., above the upper most portion of the viewable display area). The reflector reflects light outside of the display area and down onto the keyboard.

Figure 9:
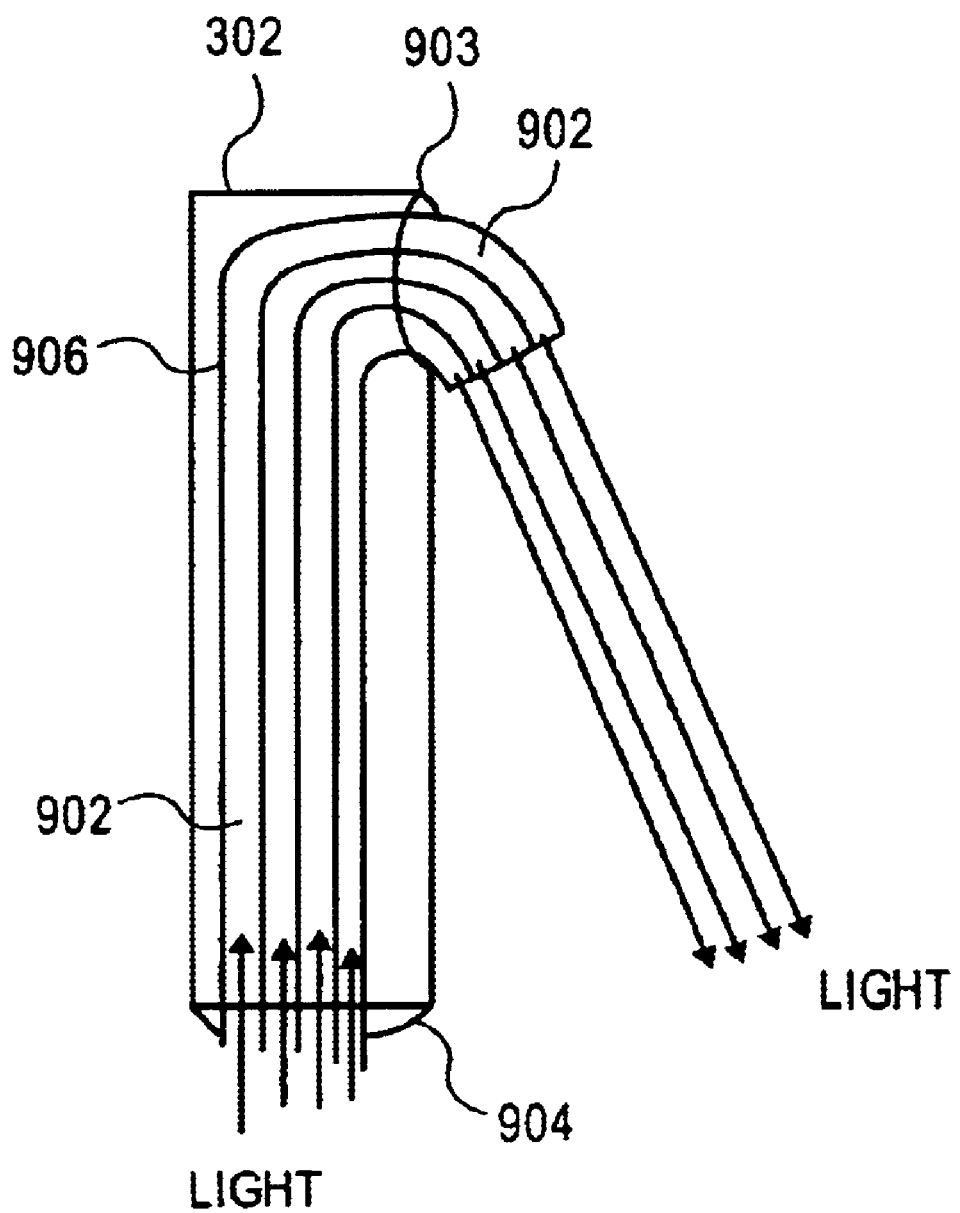
FIG. 9 illustrates an exemplary light guide tube shown in FIG. 3 wherein the light guide tubes includes a fiber optical cable to capture and redirect the light escaped from the light guide panel to illuminate the keyboard.

In one embodiment a fiber optical cable 906 is disposed within the light guide tube 302 as illustrated in FIG. 9. The light guide tube 302 has an opening 904 for light escaped from the light guide panel 202 to be captured in the light guide tube 302. The light guide tube 302 has an opening 903 for the captured light to be emitted from the light guide tube 302. In one embodiment, the openings 904 and 903 may be of any particular shape, for example, square, rectangular, or circular. In one embodiment, the opening 904 has a diameter of about 2 mm and the opening 903 has a diameter of about 2 mm.

In one embodiment, the escaped light that is captured in the light guide tube 302 enters the fiber optical cable 906, which is configured to direct and transmit light out of the light guide tube 302. As shown in FIG. 9, the fiber optical cable 906 is configured to have a bent shape that will transmit and direct the captured light in a downward direction to illuminate the keyboard 124 as shown in FIGS. 4 and 9. The fiber optically cable 906 may be "silverized," or coated with a reflective material.

In one embodiment, the fiber optical cable 906 is comprised of a plurality of optical fibers 902. The fiber optical cable 906 may be of any commercially available type. To provide an even distribution of light for all of the regions of the keyboard 124, the optical fibers 902 ideally have consistent diameter lengths. Alternatively, the optical fibers 902 may be of different diameter lengths, which are useful to provide increased brightness to a certain regions of the keyboard 124. For example, to facilitate increased brightness only in those certain regions, the optical fibers 902 that are designated to illuminate those regions may have larger diameter lengths.

Figure 10:
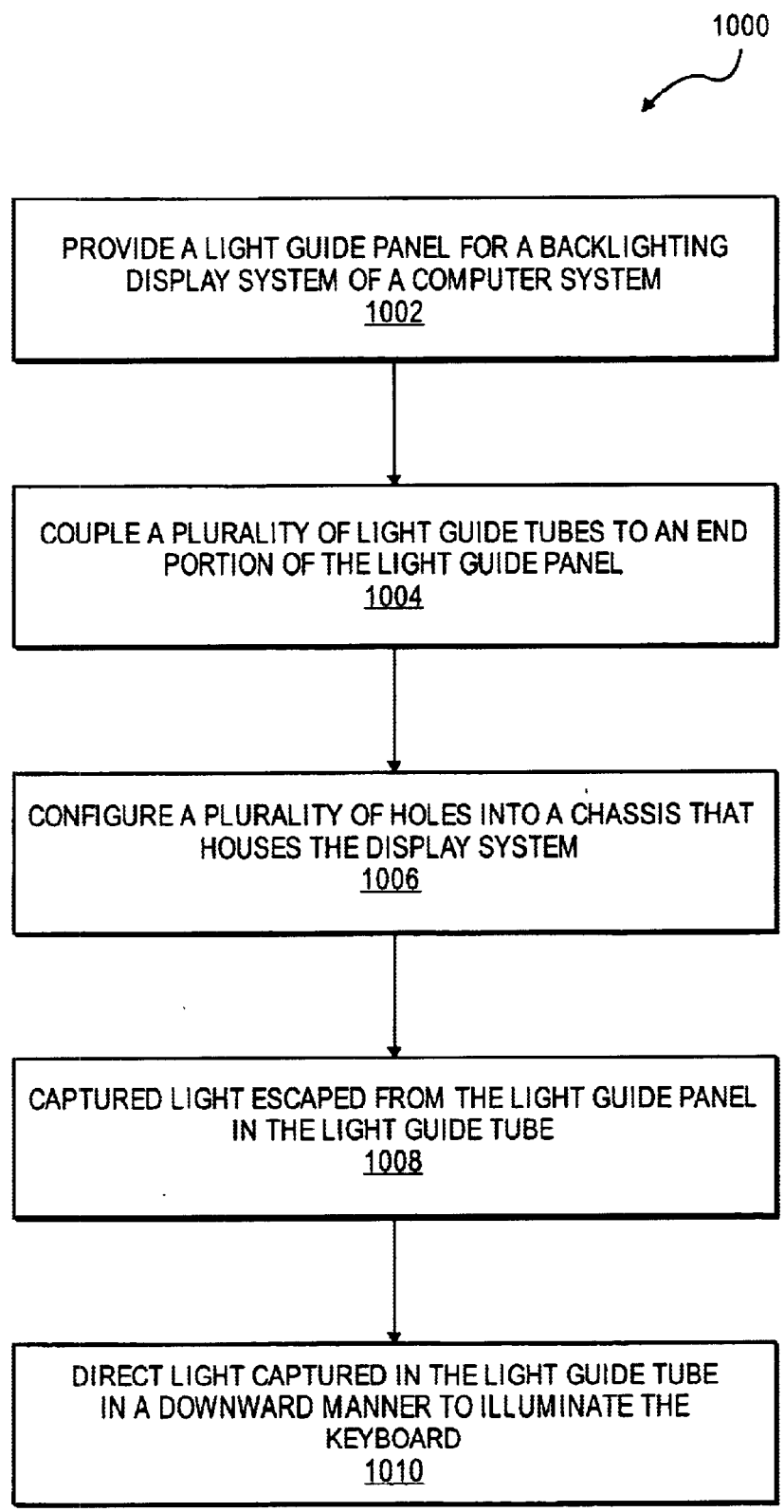
FIG. 10 illustrates an exemplary method of lighting the keyboard in accordance with some exemplary embodiments of the present invention.

FIG. 10 illustrates an exemplary method 1000 of lighting a keyboard of a computer system that has a backlighting display system such as the computer system 120. At operation 1002, the backlighting display system is provided with a light guide panel such as the light guide panel 202 previously described. At operation 1004, a plurality of light guide tubes is coupled to an end portion of the light guide panel 202. At operation 1006, a plurality of holes (e.g., holes 402) are configured into a chassis that houses the display system. At operation 1008, light that escapes at the end portion of the light guide panel 202 is not used to illuminate the display panel of the display assembly is captured in the light guide tube. At operation 1010, the light guide tube then directs the light in a downward manner as previously described to illuminate some sections or the entire keyboard of the computer system.

We claim:

1. An illumination system for a keyboard comprising:

a light guide panel disposed within a display assembly of a computer system; said light guide panel has a first end and a second end wherein light from a light source enters said light guide panel from said first end and exits through said second end;

a light guide tube coupled to said second end of said light guide panel, said light guide tube capturing said light that exits said second end and reflecting said light downward illuminating at least a portion of a keyboard of said computer system; and a plurality of holes created along an edge of a display chassis that houses said display assembly wherein said light captured and reflected by said light guide tube exits through said plurality of holes; and wherein said light guide tube comprises at least one optical fiber, said at least one optical fiber directing said light that exits said second end of said light guide panel downward to said keyboard.

2. An illumination system for a keyboard as in claim 1 wherein said light guide panel illuminates a display panel of a notebook computer.

3. An illumination system for a keyboard as in claim 1 wherein said light guide tube is a lens with at least two reflective edges directing said lights that exit said second end of said light guide panel downward to said keyboard.

4. An illumination system for a keyboard as in claim 1 wherein said light guide tube is a lens with a concave reflector.

5. An illumination system for a keyboard as in claim 1 wherein said keyboard is part of a notebook type computer system.

6. A method to illuminate a keyboard comprising:

disposing a light guide panel within a display panel of a computer system; said light guide panel has a first end and a second end, wherein light from a light source enters said light guide panel pipe from said first end and exits through said second end;

coupling a light guide tube to said second end of said light guide panel, said light guide panel capturing said light that exits said second end and reflecting said light downward to illuminate at least a portion of a keyboard of said computer system; and wherein said display panel comprising at least one hole created along an edge a display chassis that houses said display assembly wherein said lights captured and reflected by said light guide tube exit through said at least one hole; and disposing at least one optical fiber in said light guide tube, said at least one optical fiber directing said light that exits said second end of said light guide panel downward to said keyboard.

7. A method to illuminate a keyboard as in claim 6 wherein said light guide tube is a lens with a concave reflector.

8. A method to illuminate a keyboard as in claim 6 wherein said light guide tube is a lens with at least two reflective edges directing said lights that exit said second end of said light guide panel downward to said keyboard.

9. A method to illuminate a keyboard as in claim 6 wherein said keyboard is part of a notebook computer system.

10. A computer system comprising:

a light guide panel disposed within a display assembly of a computer system;

a reflector coupled to said light guide panel, said reflector reflecting light from said light guide panel and illuminating at least a portion of a keyboard of said computer system, said reflector being disposed outside of a display area of said display assembly, wherein said reflector comprises at least one optical fiber, said at least one optical fiber directing said light from said light guide panel.

11. A computer system as in claim 10 further comprising:

a display panel surrounding said display area, said display panel comprising at least one portion which is one of substantially optically transparent, substantially optically translucent, and substantially optically transmissive, said at least one portion alighted with said reflector to allow light, reflected by said reflector, to pass through said at least one portion.

12. A computer system as in claim 11 further comprising:

a hinge which couples said display assembly to a keyboard assembly which includes said keyboard, wherein an angle between said display assembly and said keyboard may be selectively adjusted;

a microprocessor coupled to said display assembly, said microprocessor causing an appearance of an image within said display area.

\* \* \* \* \*